Dec. 29, 1953        P. W. CORNELL        2,664,336
FLUIDIZED FIXED BED PROCESS
Filed Aug. 25, 1950
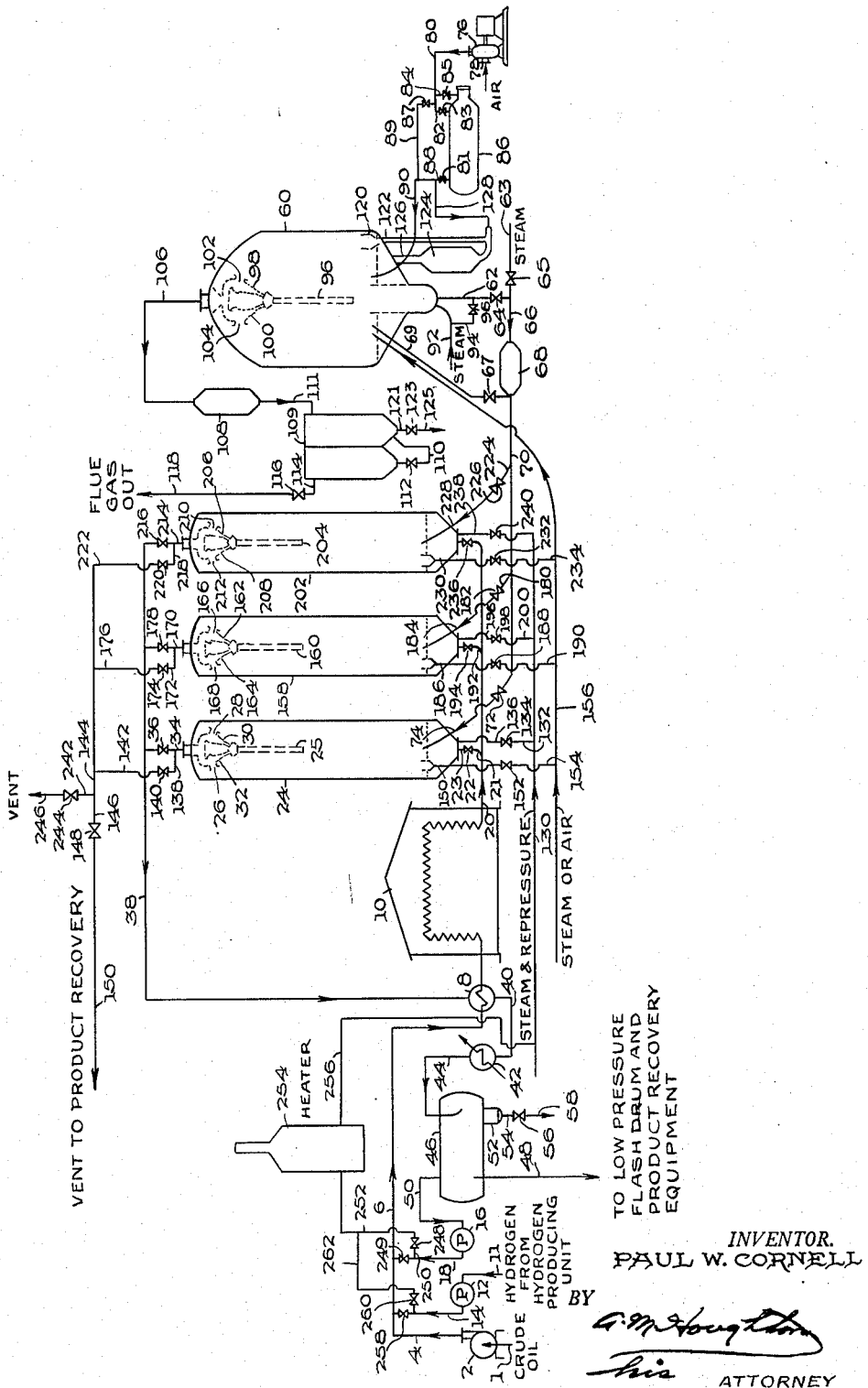
INVENTOR.
PAUL W. CORNELL
BY
ATTORNEY Patented Dec. 29, 1953

2,664,336

UNITED STATES PATENT OFFICE 2,664,336

FLUIDIZED FIXED BED PROCESS

Paul W. Cornell, Mount Lebanon, Pa., assignor to Gulf Oil Corporation, Pittsburgh, Pa., a corporation of Pennsylvania Application August 25, 1950, Serial No. 181,431

3 Claims. (Cl. 23—1)

This invention relates to catalytically promoted chemical reactions and more specifically to catalytic chemical reactions wherein the reaction is carried out under elevated pressure and wherein the heat of reaction ranges from substantially neutral to exothermic. My invention has particular utility in chemical reactions involving the conversion of hydrocarbons.

In connection with the conversion of hydrocarbons it has heretofore been known to carry out the conversion by means of fixed catalyst bed type processes. In this type of process, preheated hydrocarbons are introduced into a reactor containing a stationary bed of refractory catalyst in the form of relatively large pellets. The heated hydrocarbons are intimately contacted with the catalyst within the reactor, following which, converted hydrocarbons are withdrawn from the reactor. At the end of the on-stream cycle the charge stock flow is stopped and regenerating gases are passed through the catalyst bed within the reactor. One advantage of this type of process is that the catayst may be utilized to the entire extent of its activity, i. e., the on-stream cycle need not be stopped until the activity of the catalyst has been substantially entirely reduced. Another advantage of this type of process is that the catalyst regeneration may be carried out under optimum conditions, since the regeneration conditions are not affected by the reaction conditions. Another advantage of the fixed bed type of process is that the reaction may be carried out at very high pressure, if desired. One inherent difficulty of the fixed bed type of process is that the expensive reactor is made more expensive by being made suitable for both the conversion reaction and regeneration. Furthermore, it may be necessary to comprise the optimum reactor design in order to suit regeneration requirements, or vice versa. Another difficulty connected with this type of process is that coke laydown, a carbonaceous deposition, usually occurs and often results in partial or complete clogging of the catalyst bed. If the clogging of the catalyst bed is only partial, hot spots within the bed are developed during regeneration which may result in damage to the catalyst due to overheating. If the clogging is substantially complete, it may be impossible to regenerate the catalyst bed, simply because it is impossible to pass regenerating gas therethrough. Another difficulty involved in this type of process is that of supporting the bed of catalyst within the reactor. This element, i. e., the catalyst support, is a continuous source of difficulty in the operation of fixed bed processes. In the regeneration of fixed catalyst beds, it is usually necessary to employ an inert cooling gas, or other cooling medium in order to prevent catalyst destruction or physical injury to the reactor. The use of such cooling methods are undesirable since they require additional expensive equipment.

It has also been known to catalytically convert hydrocarbons by conventional fluidized processes. In carrying out this type of process, preheated hydrocarbons are introduced into a reactor wherein a finely comminuted refractory catalyst is maintained in a fluidized form, i. e., a turbulent state of suspension. The heated charge stock is intimately contacted with the catalyst employed, and converted hydrocarbons are continuously withdrawn from the reactor. Also, partially spent catalyst is continuously withdrawn from the reactor and conveyed to an adjacent regenerator where the catalyst is regenerated. Likewise, hot regeneratd catalyst is continually conveyed from the regenerator back to the reactor. It will be seen that throughout the process there is a continuous flow of charge stock into the reactor and a continuous flow of hydrocarbons out of the reactor, while fluidized catalyst continuously passes into and out of the reactor. In the operation of this type of process, the catalyst remains within the reactor for a comparatively short time and is never substantially completely deactivated. However, it should be noted that it is necessary to continuously withdraw catalyst prior to its complete deactivation, since cracking reactions are endothermic. The withdrawn regenerated and reheated catalyst is returned to the reactor and supplies the necessary additional heat to keep the reaction going. It should also be pointed out that this is the only practical way to supply heat to the reactor. Therefore, it will be seen that one inherent difficulty in the conventional fluidized catalytic cracking process is that the catalyst can never be utilized to the full extent of its activity. One other inherent difficulty in the process described above is that it cannot be operated economically at pressures substantially above atmospheric. This is true, since it is uneconomical and very difficult to maintain a continuous flow of catalyst from the reactor to the regenerator and back again under high pressure. It has in the past been considered equally impractical to continuously remove catalyst from a high pressure reactor, regenerate it at low pressure, and continuously return it to the high pressure reactor. In addition, it will be seen that the conventional fluidized processes are of necessity limited to approximately identical reaction pressures and regenerating pressures, which conditions may not always be most desirable for most efficient performance.

One object of this invention is to provide an improved process for carrying out catalytically promoted chemical reactions having a heat of reaction ranging from approximately neutral to exothermic. One other object of this invention is to provide an improved regenerating method for fluidized-fixed bed processes involving a chemical reaction wherein carbonaceous deposition on the catalyst occurs rapidly and/or to a great extent. Another object is to provide a conversion process wherein regeneration of the catalyst is less of a problem, since the possibility of plugging of the catalyst bed through coke laydown is eliminated. A further object is to provide an improved pressurized catalytic conversion method whereby the catalyst may be regenerated at substantially atmospheric pressure. A still further object is to provide a catalyst regeneration method wherein the need for an inert cooling gas during regeneration is eliminated, since the danger of catalyst damage resulting from overheating during regeneration has been lessened. Another object is to provide a process for carrying out a catalytic conversion under pressure while regenerating at a substantially different pressure. Another object is to provide a more economical process for converting reactant vapor under pressure by regenerating the catalyst in a vessel separate from the reactor. Still another object is to provide an apparatus in which the structure of the conveyor system between reactor and regenerator is not dictated by the amount of heat to be transferred to the reactor. An additional object is to provide a continuous process and suitable apparatus therefor, embodying the objects listed above. Other objects will appear hereinafter.

These objects are accomplished by my invention which comprises a process for catalytically promoting a chemical reaction having a heat of reaction ranging from approximately neutral to exothermic and in which the catalyst is reactivated by oxidation, said process including the steps of maintaining powdered refractory catalyst in a state of turbulent suspension within a reaction chamber, and contacting said catalyst with reactant vapor under conditions of elevated temperature and pressure. Converted product is continuously withdrawn from the reactor while substantially all of the catalyst is retained within the reaction chamber. The reaction cycle is terminated when the activity of the catalyst has been substantially reduced. The chamber is then depressured and the catalyst removed to a regenerating zone. The catalyst is regenerated by oxidation at a substantially lower pressure and at elevated temperature. The catalyst is then reused to promote an approximately neutral to exothermic chemical reaction. My invention also includes suitable apparatus for carrying out this method.

It will be seen that my invention combines the best features of the conventional fluidized type process with the best features of the fixed bed type process, without carrying over any of the inherent difficulties of either.

In the accompanying drawing is shown a flow diagram of one suitable apparatus for carrying out a specific embodiment of my invention.

In the accompanying description certain preferred modifications of my invention have been set forth. However, it will be understood that these are by way of illustration only and are not to be considered as limiting.

In general, my process is applicable to any catalytically promoted chemical reaction whose heat of reaction varies from exothermic to approximately neutral, which employs elevated reaction pressure, and wherein the catalyst becomes deactivated and is regenerated by oxidation. Examples of exothermic reactions answering this description are: the hydrogenation of aldehydes, the hydrogenation of phenol to cyclohexanol, and the hydrogenation of carbon monoxide to methane. Examples of exothermic hydrocarbon conversion reactions carried out under elevated pressure are non-destructive hydrogenation and addition reactions such as polymerization. My invention is equally applicable to processes having a heat of reaction which is approximately neutral and which are carried out at elevated pressure. Examples of this type of reaction are those in which an exothermic reaction such as one of those listed above takes place simultaneously with an endothermic reaction such as catalytic cracking, thereby producing a substantially neutral heat balance. Specific examples of this type of reaction are hydrocracking or destructive hydrogenation and hydrodesulfurization. In each of these reactions endothermic catalytic cracking takes place at the same time as the exothermic hydrogenation, thus producing what may be termed an approximately neutral or slightly exothermic reaction. My invention is also applicable to certain endothermic catalytic conversion processes which may be carried out in such a manner as to produce a substantially neutral heat balance, e. g. by preheating the reactant vapor to the necessary degree. Examples of endothermic reactions which may be operated in an approximately neutral heat balance region are hydroforming and catalytic reforming in the presence of hydrogen.

Referring now more particularly to the drawing, charge stock, shown in the drawing as crude oil, is introduced into the system through line 1. The charge stock passes through pump 2, through line 4, line 6, through heat exchanger 8 and into heater 10. The other reactant, shown in the drawing as hydrogen, enters the system through line 11. The fresh hydrogen is compressed in hydrogen compressor 12 from which it passes into line 14 through valve 258 and into line 6, where it is mixed with the charge stock. The hydrogen along with the charge stock passes from line 6 through heat exchanger 8 and into heater 10. The mixture of hydrogen and charge stock passes out of heater 10 through line 20, into line 21, through valve 22, through line 23 and into reactor 24 where it is contacted with hot, finely divided hydrogenating catalyst maintained in a fluidized state under elevated pressure. The catalyst bed is maintained in fluidized form by the flow of charge stock vapors and hydrogen therethrough and is substantially unrenewed during the onstream period.

Regardless of the nature of the charge stock, some of this material will always be in vapor form due to the preheating in heater 10 and heat exchanger 8. However, in the case of heavier charge stocks such as total crude, a portion of the total charge may be in liquid form when initially charged to the reactor. It is possible that a considerable portion of such liquid charge stock is adsorbed in the pores of the catalyst particles without wetting them sufficiently to cause agglomeration.

In instances where reactor 158 is on-stream, preheated hydrogen and charge stock pass from line 20 into line 192, through valve 194 and into reactor 158. In instances where reactor 202 is on-stream, preheated hydrogen and charge stock pass from line 20 through valve 236 and into reactor 202. A larger or smaller number of reactors may be used as desired.

While the charge stock is within the reactor, it is intimately contacted under conditions of heat and pressure with the extremely large surface of the catalyst particles. Converted hydrocarbons and a small amount of catalyst fines are continuously withdrawn from reactor 24 through openings 26 and 28 positioned in cyclone separators 30 and 32. The portion of catalyst entering the cyclone separators along with the converted hydrocarbons is desirably only a small proportion of the total catalyst and is chiefly composed of fines produced by attrition. The bulk of the catalyst remains suspended in the lower part of the reactor throughout the entire on-stream period. The catalyst fines are separated from the converted hydrocarbons within the cyclone separators and are returned to the reactor through standpipe 25. Converted hydrocarbons pass out of reactor 24 into line 34, through valve 36 and into line 38. In instances where reactor 158 is on-stream, converted hydrocarbons and some powdered catalyst are withdrawn through openings 166 and 168; powdered catalyst is separated from the converted hydrocarbons in cyclone separators 162 and 164; catalyst is returned to reactor 158 through standpipe 160, and converted hydrocarbons substantially free of catalyst pass out of the reactor into line 170 through valve 178 and into line 38. In instances where reactor 202 is on-stream, continuous streams of converted hydrocarbons and some powdered catalyst are withdrawn from the reactor through openings 210 and 212, positioned in cyclone separators 206 and 208. Powdered catalyst is separated from the stream of hydrocarbons within the cyclone separators and is returned to the reactor through standpipe 204. Converted hydrocarbons then pass out of reactor 202 into line 214, through valve 216 and into line 38. From line 38 the converted hydrocarbons are partially cooled by passing through heat exchanger 8; they then pass through line 40 and are further cooled in cooler 42. The cooled converted hydrocarbons then pass into line 44 and into high pressure separator 46. Hydrogen and hydrocarbon gases separate and pass from high pressure separator 46 into line 50, through recycle hydrogen compressor 16 into line 18. This mixture of hydrogen and hydrocarbon gases is pure enough to use as recycle hydrogen but may be further purified to concentrate the hydrogen by means of an absorber (not shown). The recycle hydrogen is then recycled into the system by passing it through valve 249 into line 6. A portion of the water contained in the product within separator 46 collects in water trap 52 and is withdrawn through line 54, through valve 56 and through line 58. The converted and condensed hydrocarbon product then passes out of high pressure separator 46 into line 48, from which it is introduced into a low pressure flash drum and other conventional product recovery equipment (not shown), by means of which the liquid hydrocarbon product is separated into various fractions.

At the termination of the on-stream cycle the flow of oil is cut out of the reactor and hydrogen flow is continued through the reactor to purge the chamber of hydrocarbons. In the accompanying schematic drawing this may be accomplished by stopping the operation of pump 2, whereupon hydrogen continues to pass from line 20 through line 21, through valve 22 and line 23 into reactor 24. More generally however, valve 22 is closed, and valves 248 and 249 are regulated to divert at least a portion of the recycle hydrogen-rich gas from line 18 into line 250 through valve 248 and into line 252. From line 252 the recycle gas flows through heater 254 into line 256 and into line 130. When desired, valves 258 and 260 may also be regulated to divert a portion of the fresh hydrogen from line 14 through valve 260 into line 252 by way of line 262. From line 130 the recycle gas or recycle gas plus fresh hydrogen passes into line 132 through valve 134 into line 136 and into reactor 24. The hydrogen employed in the purging step, as well as the hydrocarbons removed from the reactor, pass out of the reactor into line 38 and follow the same course described for the converted hydrocarbons. At the end of the hydrogen purge, in instances where hydrogen for the hydrogen purge was introduced through line 20, valves 22 and 36 are closed and valve 140 is opened. In instances where hydrogen for the hydrogen purge was introduced through line 130, valve 22 has already been closed, but valves 248 and/or 260 must be closed in addition. Valve 36 is then closed and valve 140 is opened. In either instance, the reactor is depressured into the low pressure separator (not shown) through line 138, valve 140, line 142, line 144, line 146, valve 148, and line 150. Valve 148 is closed and steam is then passed through line 130, through line 132, through valve 134, into line 136, and into reactor 24. The steam and other gases contained in the chamber pass out of reactor 24 through line 34, line 138, through valve 140 into line 142, into lines 144 and 242, through valves 244, and are vented through line 246. In instances where the on-stream and hydrogen purge cycle of reactor 158 are terminated, and where hydrogen for the hydrogen purge has been drawn from line 20, valve 174 is opened and valves 194 and 176 are closed. Where hydrogen for the hydrogen purge has been drawn from line 130, valve 194 will have already been closed, but it is also necessary to close valves 248 and/or 260. Valve 176 is then closed, and valve 174 opened. In either instance, the reactor is depressured to the low pressure separator (not shown) through lines 170 and 172, through valve 174, lines 176, 144, and 146, through valve 148, and into line 150. Valve 148 is then closed and steam is passed from line 130 through line 200, through valve 198, into line 196 and into reactor 158. The steam and other gases contained in the reactor pass out of the chamber through line 170, into line 172 through valve 174, into line 176, and into line 144. From line 144 these gases pass through line 242, valve 244 and into line 246, from which they are vented. In instances where the on-stream cycle and hydrogen purge of reactor 202 are terminated and where hydrogen for the hydrogen purge has been drawn from line 20, valves 236 and 216 are closed and valve 220 is opened. In the instance where hydrogen for the hydrogen purging has been drawn from line 130, valve 236 will have already been closed, but it is also necessary to close valves 248 and/or 260. Valve 216 is then closed and valve 220 opened. In either event, the reactor is depressured into the low pressure separator (not shown) through lines 214 and 218, through valve 220, lines 222, 144 and 146, through valve 148 and into line 150. Valve 148 is then closed and steam is passed from line 139 through valve 240, into line 238 and into reactor 202. The steam and other gases flow out of the reactor into line 214, line 218, through valve 220 into line 222 and into line 144. From line 144 these gases pass into line 242, through valve 244 and into line 246, from which they are vented.

At this point catalyst is removed from the reactor and conveyed to the regenerator. This is accomplished in reactor 24 by closing valve 134 and opening valve 152. Steam, flue gas, or air is passed through line 156. Catalyst from reactor 24 passes from the reactor into line 150, through valve 152, through line 154 and into line 156. In instances where the catalyst within reactor 158 is to be regenerated, valve 198 is closed and valve 188 is opened. Catalyst then passes from reactor 158 through line 186, through valve 188 into line 190 and into main conveyor line 156. In instances where reactor 202 has been on-stream, valve 240 is closed and valve 232 is opened. Catalyst contained in the reactor passes into line 230 through valve 232 into line 234 and into main conveyor line 156.

The spent catalyst and gaseous conveying medium flows from line 156 into regenerator 60 where the catalyst is regenerated by combustion of the contaminants with air or other oxidizing gas. In the modification shown in the drawing, air is introduced into the regenerating system through opening 78, through pump 76, into line 80, through line 82 and valve 83 and into air heater 86. A portion of the air from line 80 is diverted into line 84 through valve 85 to supply air to the burner of the air heater. Air heated by the heater 86 passes through valve 81 into line 88, through line 90 and into regenerator 60, where it is used to initiate the burning off of the contaminants on the catalyst. Once the regeneration is started, i. e., after the burning has commenced, burner 86 is blocked off by closing valves 81, 83, and 85. Valve 87 is opened and unheated air is bypassed around the heater through line 89. This bypassing is possible, since, once started, the regeneration is exothemic, and no additional heat is required.

In some instances, as will be hereinafter described, the regeneration of the catalyst involves not only burning off the carbon but also reconverting the catalyst to the oxide form. A continuous flow of flue gas containing some regenerated catalyst passes through openings 102 and 104 into cyclone separators 98 and 100. Preferably, only a portion of the catalyst enters the cyclone separators, with the bulk of the catalyst being maintained in a fluidized state in the lower portion of the regenerator. A substantial portion of the powdered catalyst contained in the flue gas is separated and returned to the catalyst regenerator through standpipe 96. Flue gas and a very small portion of regenerated catalyst pass out of the regenerator into line 106 and into trim cooler 108. From trim cooler 108 the flue gas and the very small portion of regenerated catalyst pass through line 111 into Cottrell precipitator 103, where the last portion of catalyst is separated from the flue gases. Flue gas passes out of the Cottrell precipitator through line 114, through valve 116 and into line 118. Regenerated catalyst which has been recovered in the Cottrell precipitator is withdrawn at the bottom thereof through line 121, through valve 123 and line 125. In order to remove the heat of combustion of the contaminants and prevent overheating of the catalyst within the regenerator, a means of continuously cooling the catalyst during regeneration is provided. A portion of the catalyst within the regenerator passes into collector 120, through line 122, and into cooler 124. A portion of the air from line 80, or line 89 after burner 86 has been blocked off, is diverted through line 128 and into cooler 124 in order to provide means for transporting the catalyst from the cooler back through line 126 into the regenerator.

After the catalyst has been transferred to the regenerator, and after at least a portion of the regeneration has been completed, the conveying system is reversed, and catalyst is reconveyed to a reactor. Steam is introduced through line 92 in order to strip the regenerated catalyst of flue gas. Valves 96, 64 and 65 are opened. A portion of the steam is diverted from line 92 through line 94, through valve 96 and into line 62. This steam serves in part to strip the catalyst in line 62 but is employed principally to areate the column of catalyst and thus prevent packing. Steam passes from line 63 through valve 65 and into line 66. This steam is used to convey the regenerated catalyst. The regenerated catalyst and its transporting medium, steam, pass from line 66 into cooler 68 and into line 70.

At this point it will be seen that one of several modifications may be practiced. For example, regenerated catalyst may be introduced into the conveyor system from cooler 124 and line 126. However, in that event air would be the conveying medium. Since steam is the preferred transporting medium, the illustrated modification which employs an additional trim cooler 68 is preferred. In addition, I contemplate employing a line 69 and valve 67 connecting the reactor side of cooler 68 with regenerator 60. By means of this line and valve, regenerated catalyst could be recycled into the regenerator during such periods as no regenerated catalyst is being transported to the reactors. The purpose of this modification would be to keep a continuous flow of hot catalyst through trim cooler 68 and thus eliminate thermal strains which would otherwise be produced.

In the instance where reactor 24 is to be refilled with regenerated catalyst, the regenerated catalyst and its conveying medium, steam, pass from line 70 through valve 72, into line 74 and into reactor 24. In instances where it is desired to refill reactor 158 with regenerated catalyst, the catalyst and transporting medium pass from line 70 into line 180, through valve 182, through line 184 and into the reactor. In instances where it is desired to refill reactor 202 with regenerated catalyst, the catalyst and its transporting medium pass from line 70 through line 224, through valve 226, through line 228 and into the reactor. In each case the steam employed in conveying the catalyst to the reactor is vented through line 246.

When the desired reactor, for example reactor 24, has been refilled with regenerated catalyst, valve 72 is closed; the reactor is blocked off by closing valves 22, 36, and 140 and is then repressured, for instance by passing hydrogen or propane through line 130, into line 132, through valve 134, through line 136 and into the reactor. In instances where the reactor 158 has been refilled with regenerated catalyst, valve 182 is closed and the reactor is blocked off by closing valves 174, 178 and 194. The reactor is then repressured by passing hydrogen or propane, for example, through line 130, into line 200, through valve 198 into line 196 and into the reactor. In instances where reactor 202 has been refilled with regenerated catalyst, valve 226 is closed and the reactor is blocked off by closing valves 216, 220 and 236. The reactor is then repressured, for example by passing hydrogen or propane through line 130, through valve 240 into line 238 and into the reactor. After repressuring, the flow of hydrogen and charge stock is cut into the reactor.

A typical operating cycle for a system as illustrated, which employs three reactors (or a multiple thereof) and a 4-hour processing period, might be as follows: Oil is cut into reactor 24 and out of reactor 202 which has been on-stream for four hours. At this point, reactor 158 has been operating for two hours, and, like reactor 24, is operating under conditions of elevated temperature and pressure, for example 850° F. and 500 p. s. i. g. Hydrogen is continued through reactor 202 for approximately 10 minutes, at which time the reactor is blocked off and depressured to the low pressure separator (not shown). Steam is then introduced for 5 minutes. At the end of this period the valves controlling the conveyor system are opened and the catalyst is passed to the regenerator at such a rate that about 45 minutes or less are required to empty the reactor. The system is then reversed and for about 45 minutes or less the reactor is supplied with the required amount of catalyst of the desired temperature. Catalyst flow is stopped and steam continued to vent line 246 for 5 minutes, at which time vent valve 244 is closed off and hydrogen or propane is cut into repressure reactor 202. Hydrogen flow is established and oil cut in approximately 2 hours from the time oil flow was stopped. At this point, reactor 158 has been on-stream 4 hours and now undergoes the cycle steps described for reactor 202. Where the process is operated continuously, as in the description given above, all valves involved in the switching operations are desirably time cycle controlled, i. e., these valves are set to be operated automatically after a certain period of time has elapsed.

As stated above, a greater or lesser number of reactors may be employed as desired. It will be obvious that a system employing a 4-hour processing period and a 2-hour non-processing period, i. e., hydrogen purge, steaming, depressuring, transfer of deactivated catalyst out and regenerated catalyst in, and repressuring, may be carried out continuously with only two reactors. However, by increasing the number of reactors by one-half, or to a total of three, the yield may be doubled without increasing the size of the conveyor system, since two reactors will be on-stream at all times. On the other hand, if the number of reactors is increased to four with the same time of processing and regeneration, two reactors would be on-stream part of the time and three reactors on-stream during another part of the time. In such a modification, however, two reactors would be off-stream simultaneously, in which case the size of the conveyor system would necessarily have to be doubled. Accordingly, the most desirable operation would employ a balance between the amount of yield, the number and size of reactors, and the size of the conveyor system. However, a system employing four or more reactors and one regenerator may be utilized successfully, without increasing the size of the conveying system, by reducing the time required for catalyst transfer. It should be noted that the structure of the conveyor system employed in my apparatus is not dictated by problems of the amount of heat to be transferred to the reactor as in conventional fluidized catalytic cracking systems, but merely by considerations of transferring the required amount of catalyst in the optimum economic time.

As stated above, my process is applicable to any catalytically promoted chemical reaction which utilizes elevated pressure, which has a heat of reaction varying from approximately neutral to exothermic, and in which the catalyst is reactivated by oxidation. In carrying out a hydroforming reaction, for example, where hydrogen is present but not consumed substantially, line 11, pump 12, and line 14 may or may not be employed to introduce hydrogen. When carrying out other processes not involving hydrogenation, line 11, pump 12 and line 14 may be utilized to introduce a reactant other than hydrogen and other than that introduced into the system through line 1. It is also sometimes desirable to employ a flow of diluent fluid in exothermic reactions for the purpose of temperature control within the reactor, even in instances where the fluid is not consumed. In such instances, the apparatus as illustrated could be employed with the fluid entering the system through line 11, pump 12 and line 14, while the reactant or reactants enter through line 1, pump 2 and line 4.

In general, I contemplate using catalysts and working conditions usually employed with the specific type of process being carried out in my apparatus. These catalysts and conditions are well known to the art, and therefore, it is not considered necessary to list them in detail. However, for purposes of illustration, a few examples of catalysts which may be used in preferred modifications will be given. In one preferred form of my invention wherein a hydrocracking process is carried out, examples of satisfactory catalysts are oxides of vanadium, chromium, tungsten, aluminum, titanium, magnesium, molybdenum and zirconium, advantageously composited with a carrier to give the desired density and size for fluidized-fixed bed operations. These catalysts are merely given by way of example. Other catalysts may be used with equal facility. In general it appears that any catalyst having both hydrogenating and cracking properties may be employed.

I consider my process to be of particular value in connection with one species of hydrogenation, namely catalytic hydrodesulfurization. Examples of satisfactory catalysts which may be employed in my process as applied to catalytic hydrodesulfurization are: heavy metal aluminosilicates, cobalt thiomolybdate, tungsten-nickel-sulfide, tungsten-iron-sulfide, nickel, nickel oxide, nickel sulfide, molybdenum oxide-zinc oxide-magnesia, molybdenum oxide-chromium oxide, nickel-copper-alumina, molybdic oxide-nickeliferous oxide, molybdic oxide, copper oxide, cobalt molybdate, molybdic sulfide and tungsten sulfide, each being advantageously composited with a carrier. Nickel, iron, cobalt, their oxides, chromates, molybdates and tungstates are very satisfactory hydrodesulfurization catalysts.

The porous support or carrier mentioned above (which may possess some catalytic activity) may be any conventional material for this purpose, such as microspheres of a synthetically prepared silica-alumina cracking catalyst or powdered activated alumina or silica-alumina. Powdered silica gel, kieselguhr, and acid treated pumice are further examples of satisfactory supports for the above listed catalysts. Other powdered synthetically prepared carriers which may be used are silica-zirconia, silica-titania, alumina-titania, and silica-alumina-boric oxide. These carriers may be prepared by coprecipitation or impregnation.

The composited catalysts may be made by impregnating the microspheroidal or powdered carrier with a solution of a soluble salt of the metal, such as a nitrate, followed by calcining to form the oxide and followed by reduction if a metal or mixture of metal and metal oxide is to be used, or by sulfiding where a sulfide catalyst is desired. Also porous particles impregnated with one metal or metal oxide may be employed in admixture with porous particles impregnated with one or more other metals or oxides. In order that the catalyst may be maintained in a turbulent, suspended condition, the size of the individual particles should not substantially exceed about 60 mesh, i. e., about 0.833 millimeter in diameter.

The on-stream period for the individual reactor should be terminated when the activity of the catalyst has been substantially reduced. In connection with most of the catalysts listed above, the reduction of catalyst activity is due primarily to coke laydown, i. e., a carbonaceous deposit on the catalyst resulting from cracking. Obviously, burning off this layer of carbon, as carried out in the regenerator, operates to reactivate the catalyst in such instances. In the instance of certain metal or oxide catalysts for hydrodesulfurization processes, sulfiding of the metal or oxide contact may occur. The regeneration treatment in this type of process burns off the carbonaceous deposit as well as the sulfur.

The temperature range for operations in accordance with my invention varies depending upon the reaction involved, i. e., the temperature is that which is conventional for the particular reaction. For example, a temperature range between about 100° F. and about 600° F. is generally used for non-destructive hydrogenation. Destructive hydrogenation usually involves a temperature between about 600° F. and about 1000° F. A temperature range of about 225° F. to about 650° F. is usually employed in connection with polymerization reactions, the temperature varying according to the particular catalysts and pressures employed. As regards the destructive hydrogenation of heavy charge stocks, such as total or reduced crude, a preferred embodiment of my invention, temperature between about 750° F. and 950° F. are most useful and especially those between about 800° F. and 870° F. However, lower or higher temperatures can be used.

The pressure employed may vary quite widely from about 100 p. s. i. g. to about 3000 p. s. i. g., again depending on the reaction involved. Pressures in the lower portion of this range are preferred for economic reasons, and since the catalyst bed may be maintained in fluidized condition more easily at lower pressures. At the same time these pressures are sufficient to produce a satisfactory rate of hydrogenation in modifications of my process which employ hydrogen, such as hydrocracking or hydrodesulfurization.

The hydrogen to oil ratio may be varied over an extremely wide range in processes involving hydrogen treatment of hydrocarbons, but is preferably between about 300 and about 20,000 s. c. f./bbl. (standard cubic feet per barrel). Higher ratios are preferred in connection with treatment of heavier charge stocks. I have found that any hydrogen purity above about 50 per cent produces satisfactory results in modifications of my process which involve hydrocracking. The throughput may vary from 1–12. In all instances, however, the rates of flow of the reactants, e. g., hydrogen and charge stock, are correlated to produce a fixed fluidized catalyst bed.

Any reactant which exists in gaseous, vapor, or partly vapor form at reaction conditions may be employed as a reactant vapor, so long as it or they produce an approximately neutral to exothermic reaction, and so long as the catalyst may be regenerated by oxidative action. Thus, by "reactant vapor" in the accompanying description and the appended claims I mean a substance or substances answering to this description.

As regards hydrocarbons, my invention is applicable to any charge stock, so long as it may exist at least partly in vapor form at reaction conditions. However, my invention is particularly useful as applied to the conversion of heavy charge stocks such as total, reduced or topped crude, and especially those of low API gravity and high sulfur content, since these stocks require high treating temperatures, the use of which produces increased coke laydown. Since my invention is particularly applicable to processing conditions involving regeneration to remove relatively large amounts of contaminants, these heavy stocks can be economically processed.

Regeneration of the catalyst is carried out at a temperature sufficient to remove contaminants or otherwise restore the activity of the catalyst but insufficient to cause physical damage to the catalyst particles. When reactivation is carried out so as to burn off a carbonaceous deposit, this temperature preferably varies from about 1000° F. to about 1200° F.

While regeneration under pressure is desirable from a rate standpoint, economical considerations and the mechanical difficulties involved indicate the preferred regeneration pressure to be below about 50 p. s. i. g., i. e., substantially atmospheric pressure.

The rate of flow of the reactants through the catalyst bed in either the reactor or the regenerator may vary widely. In general, the upper limit is governed only by the time of contact desired, the contact time being more or less inversely proportional to the rate of flow of the reactants. The rate of flow may be so great, for example, as to impart violent turbulence, ebullition and/or random motion to the particles throughout the reactor. This type of motion may be termed true fluidization. In these instances a larger portion of the catalyst may be blown out of the reactor and returned through the cyclones. The rate of flow should be at least great enough to suspend the particles and produce a moderate turbulence or ebullition. A rate of flow in or near this portion of the range produces what may be termed "expanded bed" operation. Any of the above described degrees of turbulence may be used in the reactor or regenerator, with the same or a different degree of turbulence being employed in the respective vessels. Specific flow rates sufficient to produce the turbulence described vary according to the size of the catalyst particles, their density, and the width and depth of the catalyst bed. In certain reactions, e. g., hydrocracking of heavy hydrocarbons, where the charge stock is converted with greater difficulty, a low rate of flow of the reactants into the reactor is preferable where more complete conversion is desired, since this allows at least a portion of the more difficultly convertible hydrocarbons to remain under reaction conditions for a longer period of time. Where catalyst deactivation is due to a large degree of coke laydown, and where the regeneration comprises burning off this coke, as in hydrocracking of heavy charge, for example, true fluidization of the catalyst particles in the regenerating vessel is advantageous. This is because a more rapid rate of flow through the catalyst bed is advantageous to rapidly regenerate and effectively remove a part of the heat of combustion, thus preventing damage to the catalyst due to overheating.

In these facts lie one of the principal advantages of my process over a fluidized fixed bed process in which the catalyst is regenerated within the reactor. Since it is advantageous to regenerate the catalyst under true fluidized conditions, the catalyst, during regeneration, occupies much more space than it occupies during the on-stream period, where mere "expanded bed" conditions may exist. If the catalyst were regenerated in the reactor, the reactor would necessarily have to be much larger to accommodate the additional volume required by the catalyst during the true fluidization present during regeneration. By providing a separate regeneration vessel, I may reduce the size of the expensive pressure reaction vessel. In multiple reactor systems, the saving produced is quite substantial.

To illustrate, where the regeneration is carried out in the reactor, the total length of reactors for a 20,000 bbl./day unit, with a 0.4% by weight carbon laydown, would be 975 ft. On the other hand, where a separate regenerating vessel is employed, only 350 feet total length of reactors would be required. These figures assume identical diameters for the reactors. This comparison may be seen more clearly from the following table:

|  | Regeneration in same vessel | Regeneration in separate vessel |
| --- | --- | --- |
| Number of reactors | 13 | 10 |
| Reactor height | 75 | 35 |
| Total reactor height | 975 | 350 |

Thus, in the proposed apparatus a saving of 625 feet of expensive heavy-walled pressure vessel is made possible.

I do not intend to be limited to the particular details of structure as illustrated in the drawing. For example, the charge stock and hydrogen or other reactant may be preheated separately and introduced separately into the reactor.

In a preferred form of my invention one or more additional charges of catalyst are maintained in the regenerator. When the on-stream cycle of a given reactor has been terminated and the deactivated catalyst has been completely removed to the regenerator, the reactor which has been emptied is quickly refilled with the mixture of regenerated catalysts originally in the regenerator and the partially regenerated catalyst obtained from the reactor. Thus the reactor is refilled with catalyst of high average activity before regeneration of all the deactivated catalyst is fully complete. As a result of this the reactor may be placed on-stream again quickly even in instances where coke laydown is very great. This reactor is then repressured and placed on-stream again, while the remaining deactivated catalyst withdrawn from the reactor is being regenerated. In this manner the reactors are off-stream for a shorter period of time, and more efficient use is made of these expensive vessels. In this modification, the regenerator may operate continuously, thus eliminating the necessity for repeatedly starting up combustion. The maintenance of an extra amount of catalyst in the regenerator also prevents great fluctuation in the level of the catalyst bed therein.

Whether or not extra catalyst is maintained in the regenerator, I contemplate either completely regenerating all of the deactivated catalyst prior to the return of any catalyst to the reactor, or prompt return of catalyst to the reactor with regeneration being carried out in the regenerator during catalyst transport.

One advantage of my invention is that it provides an improved regenerating method for fluidized-fixed bed processes, wherein carbonaceous deposition on the catalyst is very great. I have also provided a process in which regeneration of the catalyst is less of a problem, since the possibility of plugging of the catalyst bed through coke laydown has been eliminated. My invention also produces an improved catalyst regeneration method whereby the catalyst may be regenerated at substantially atmospheric pressure, although the reaction is carried out at elevated pressure. Another advantage produced by my invention is that the need for inert cooling gas during regeneration is eliminated, since the danger of catalyst damage resulting from overheating during regeneration has been lessened. Still another advantage is that I have provided an apparatus in which the structure of the conveyor system between reactor and regenerator is not dictated by the amount of heat to be transferred to the reactor. A further and important advantage of my process and apparatus is that the cost of the equipment is reduced substantially by reducing the insulation requirements for the reactors. I have also provided a continuous method and apparatus therefor, embodying the advantages listed above. I have further provided a method and apparatus wherein a substantial saving is effected by regenerating in a vessel separate from the reaction vessel.

What I claim is:

1. In a process for catalytically promoting a chemical reaction, wherein the heat of reaction ranges from approximately neutral to exothermic and in which the catalyst is reactivated by oxidation, the steps comprising maintaining powdered refractory catalyst in a state of turbulent suspension within a reaction chamber, contacting said catalyst with a stream of reactant vapor under conditions of elevated temperature and pressure, continuously withdrawing converted product while retaining substantially all of the catalyst within the reaction chamber, terminating the reaction cycle when the activity of the catalyst has been substtantially reduced, depressuring the reaction chamber, removing the catalyst to a regenerating zone, regenerating the catalyst by subjecting it to an oxidizing treatment at elevated temperature and at a substantially lower pressure while in a state of turbulent suspension, continuously cooling the catalyst in the regenerator, removing regenerated catalyst from the regenerating zone, cooling the removed regenerated catalyst to reaction temperature in a cooling zone, returning regenerated and cooled catalyst to the reaction chamber, repressuring the reaction chamber, again utilizing the cooled and regenerated catalyst to promote said approximately neutral to exothermic reaction, and continuously circulating hot regenerated catalyst through said cooling zone during such periods as the catalyst is not being returned to the reactor to avoid thermal strains that would be encountered by intermittent passage of hot catalyst therethrough.

2. In a process for catalytically promoting a chemical reaction, wherein the heat of reaction ranges from approximately neutral to exothermic and in which the catalyst is reactivated by oxidation, the steps comprising passing a reactant vapor upwardly through a bed of powdered refractory catalyst within a reaction chamber at a rate sufficient to produce only moderate turbulence of the catalyst particles and in order to intimately contact the catalyst with said charge stock, said contacting being carried out under conditions of elevated temperature and pressure, continuously withdrawing converted product while retaining substantially all of the catalyst within the reaction chamber, terminating the reaction cycle when the activity of the catalyst has been substantially reduced, depressuring the reaction chamber, removing the catalyst to a regenerating chamber, regenerating the catalyst by passing an oxidizing gas upwardly through the regenerating chamber at a rate sufficient to produce considerably greater turbulence of the catalyst particles than is produced in the reaction chamber, said regeneration taking place at elevated temperature and at a substantially lower pressure, removing regenerated catalyst from the regenerating chamber, returning regenerated catalyst to the reaction chamber, repressuring the reaction chamber, and again utilizing the regenerated catalyst to promote said approximately neutral to exothermic reaction.

3. In a process for catalytically promoting a chemical reaction, wherein the heat of reaction ranges from approximately neutral to exothermic and in which the catalyst is reactivated by oxidation, the steps comprising maintaining powdered refractory catalyst in a state of turbulent suspension within a reaction chamber, contacting said catalyst with a stream of reactant vapor under conditions of elevated temperature and pressure, continuously withdrawing converted product while retaining substantially all of the catalyst within the reaction chamber, terminating the reaction cycle when the activity of the catalyst has been substantially reduced, depressuring the reaction chamber, removing the catalyst to a regenerating zone which contains an extra charge of powdered catalyst which is continuously undergoing oxidative regeneration while in a state of turbulent suspension at a substantially lower pressure than exists in the reactor, removing a mixture of regenerated and unregenerated catalyst from the regenerating zone, introducing this removed mixture into the reactor promptly after termination of removal of inactive catalyst from the reactor and while part of the inactive catalyst removed from the reactor is still undergoing regeneration, promptly repressuring the reaction chamber and again utilizing the regenerated catalyst to promote said approximately neutral to exothermic reaction.

PAUL W. CORNELL.

References Cited in the file of this patent

UNITED STATES PATENTS

| Number | Name | Date |
|---|---|---|
| 2,265,837 | Harding | Dec. 9, 1941 |
| 2,273,864 | Houdry | Feb. 24, 1942 |
| 2,356,717 | Williams | Aug. 22, 1944 |
| 2,417,164 | Huber | Mar. 11, 1947 |
| 2,434,537 | Barr et al. | Jan. 13, 1948 |
| 2,515,373 | Keith et al. | July 18, 1950 |
| 2,546,625 | Bertstrom | Mar. 27, 1951 |
| 2,585,238 | Gerhold | Feb. 12, 1952 |

FOREIGN PATENTS

| Number | Country | Date |
|---|---|---|
| 383,616 | Great Britain | Feb. 13, 1931 |